(12) United States Patent
Jurik et al.

(10) Patent No.: US 10,900,634 B2
(45) Date of Patent: Jan. 26, 2021

(54) COLLIMATED EFFECT LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 44 days.

(21) Appl. No.: 15/125,161

(22) PCT Filed: Mar. 10, 2015

(86) PCT No.: PCT/US2015/019741
§ 371 (c)(1),
(2) Date: Sep. 10, 2016

(87) PCT Pub. No.: WO2015/138476
PCT Pub. Date: Sep. 17, 2015

(65) Prior Publication Data
US 2019/0195471 A1    Jun. 27, 2019

Related U.S. Application Data

(60) Provisional application No. 61/950,387, filed on Mar. 10, 2014.

(51) Int. Cl.
*F21V 5/00* (2018.01)
*G02B 19/00* (2006.01)
(Continued)

(52) U.S. Cl.
CPC .............. *F21V 5/003* (2013.01); *F21V 5/008* (2013.01); *F21V 14/06* (2013.01);
(Continued)

(58) Field of Classification Search
CPC .. F21V 14/06; F21V 5/008; F21V 14/04–085; G02B 19/00; G02B 19/0052–0057
See application file for complete search history.

(56) References Cited

U.S. PATENT DOCUMENTS 5,202,869 A * 4/1993 Miyake ................. G02B 13/10
369/112.12
6,474,837 B1 * 11/2002 Belliveau ................ F21L 4/027
362/231

(Continued)

FOREIGN PATENT DOCUMENTS

DE          2150341 A1    6/1973
WO    2013142436 A1    9/2013

OTHER PUBLICATIONS

PCT International Search Report; Application No. PCT/US2015/019741; dated Nov. 4, 2015; 3 pages.
(Continued)

*Primary Examiner* — Anabel Ton
(74) *Attorney, Agent, or Firm* — Conley Rose, P. C.; Grant Rodolph; Brooks W Taylor

(57) ABSTRACT

This specification describes an improved automated luminaire including a plurality of light emitting modules, each including a laser module and an optical module, which expands the width of the laser light beam emitted from the laser module.

9 Claims, 5 Drawing Sheets

(51) Int. Cl.
*F21V 14/06* (2006.01)
*F21Y 113/10* (2016.01)
*F21W 131/406* (2006.01)
*F21Y 115/10* (2016.01)
*F21W 131/40* (2006.01)

(52) U.S. Cl.
CPC ..... *G02B 19/0028* (2013.01); *G02B 19/0052* (2013.01); *F21W 2131/40* (2013.01); *F21W 2131/406* (2013.01); *F21Y 2113/10* (2016.08); *F21Y 2115/10* (2016.08)

(56) References Cited

U.S. PATENT DOCUMENTS

| | | | | |
|---|---|---|---|---|
| 8,449,141 | B1* | 5/2013 | Hinrichs | F21V 21/15 362/235 |
| 8,926,122 | B2* | 1/2015 | Cavenati | F21S 8/00 362/235 |
| 9,097,413 | B2* | 8/2015 | Chien | F21S 9/02 |
| 2007/0109784 | A1 | 5/2007 | Kosnik et al. | |
| 2010/0226015 | A1 | 9/2010 | Taira et al. | |
| 2015/0211708 | A1* | 7/2015 | Stavely | F21V 5/007 348/164 |
| 2016/0245490 | A1* | 8/2016 | Jurik | F21V 14/02 |
| 2016/0246040 | A1* | 8/2016 | Jurik | F21S 10/007 |
| 2016/0298829 | A1* | 10/2016 | Jurik | F21V 17/02 |
| 2017/0153004 | A1* | 6/2017 | De Zwart | F21V 5/007 |
| 2018/0112858 | A1* | 4/2018 | Bowden | F21V 21/30 |

OTHER PUBLICATIONS

PCT Written Opinion of the International Searching Authority; Application No. PCT/US2015/019741; dated Nov. 4, 2015; 4 pages.

* cited by examiner

COLLIMATED EFFECT LUMINAIRE

CROSS-REFERENCE TO RELATED APPLICATIONS

This application is a National Stage of International Patent Application No. PCT/US15/19741 filed Mar. 10, 2015 by Pavel Jurik, et al. entitled, "Collimated Effect Luminaire", which claims priority to U.S. Provisional Application No. 61/950,387 filed Mar. 10, 2014 by Pavel Jurik, et al. entitled, "Collimated Effect Luminaire.

TECHNICAL FIELD OF THE DISCLOSURE

The present disclosure generally relates to a method for controlling the light output from a laser when used in a light beam producing luminaire, specifically to a method relating to producing a wide, parallel beam and for controlling the size of that beam.

BACKGROUND OF THE DISCLOSURE

It is well known to use lasers in luminaire designed for entertainment use in theatres, television studios, concerts, theme parks, night clubs, and other venues. These lasers are also being utilized in systems with automated and remotely controllable functionality. However, a concern with all laser systems is the safety of the light emitted. Any high-powered system cannot be allowed to directly impinge on the eye of a viewer, as it will damage the lens or retina. Further, the major feature of a laser beam is that it is narrow and parallel (collimated). In some circumstances however, it would be advantageous if the light beam could remain collimated but be much wider. A wider beam has the advantage that it is more visible as a solid bar in the air, particularly if fog or haze is used, and that a wide beam will have a much lower power density and will consequently be much less dangerous.

For color control it is common to use an array of lasers of different colors. For example a common configuration is to use a mix of Red, Green, and Blue lasers. This configuration allows the user to create the color they desire by mixing appropriate levels of the three colors. For example, illuminating the Red and Green lasers while leaving the Blue extinguished will result in an output that appears Yellow. Similarly Red and Blue will result in Magenta, and Blue and Green will result in Cyan. By judicious control of these three controls the user may achieve any color they desire. More than three colors may also be used and it is possible to add an Amber or White laser to the Red, Green, and Blue to enhance the color mixing and improve the gamut of colors available.

There is a need for a beam control system for a laser based luminaire that provides improvements in beam collimation, beam size adjustment, and safety.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to a method for controlling the light output from a laser when used in a light beam producing luminaire, specifically to a method relating to producing a wide, parallel beam and for controlling the size of that beam.

Figure 1:
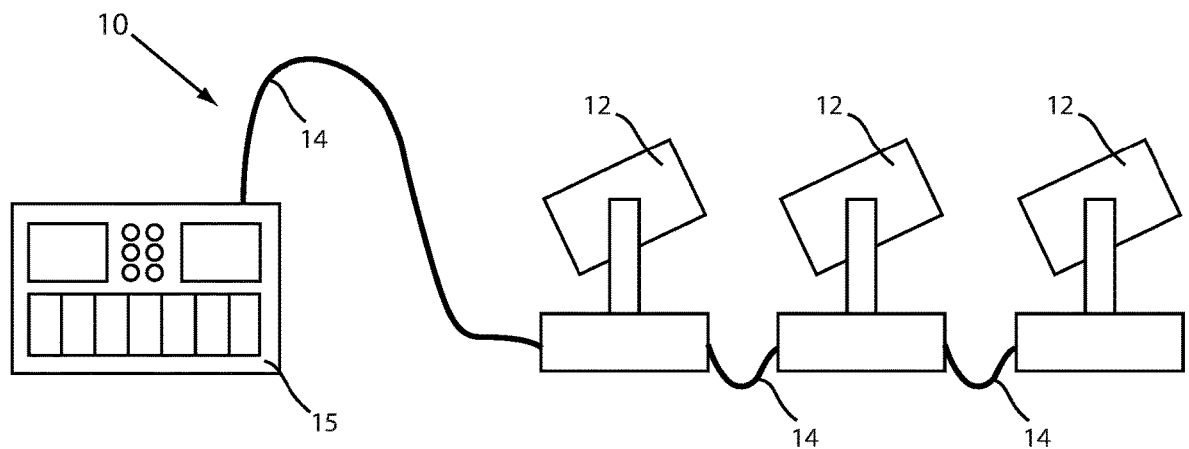
FIG. 1 illustrates a typical multiparameter automated lighting system.

FIG. 1 illustrates a typical multiparameter automated lighting system 10. These systems commonly include a plurality of multiparameter automated luminaires 12 which typically each contain on-board an array of Light Emitting Diodes (LEDs), and electric motors coupled to mechanical drive systems and control electronics (not shown). In addition to being connected to mains power either directly or through a power distribution system (not shown), each luminaire is connected in series or in parallel to data link 14 to one or more control desk(s) 15. The automated luminaire system 10 is typically controlled by an operator through the control desk 15. Consequently, to effect this control, both the control desk 15 and the individual automated luminaires 12 typically include electronic circuitry as part of the electromechanical control system for controlling the automated lighting parameters.

Figure 2:
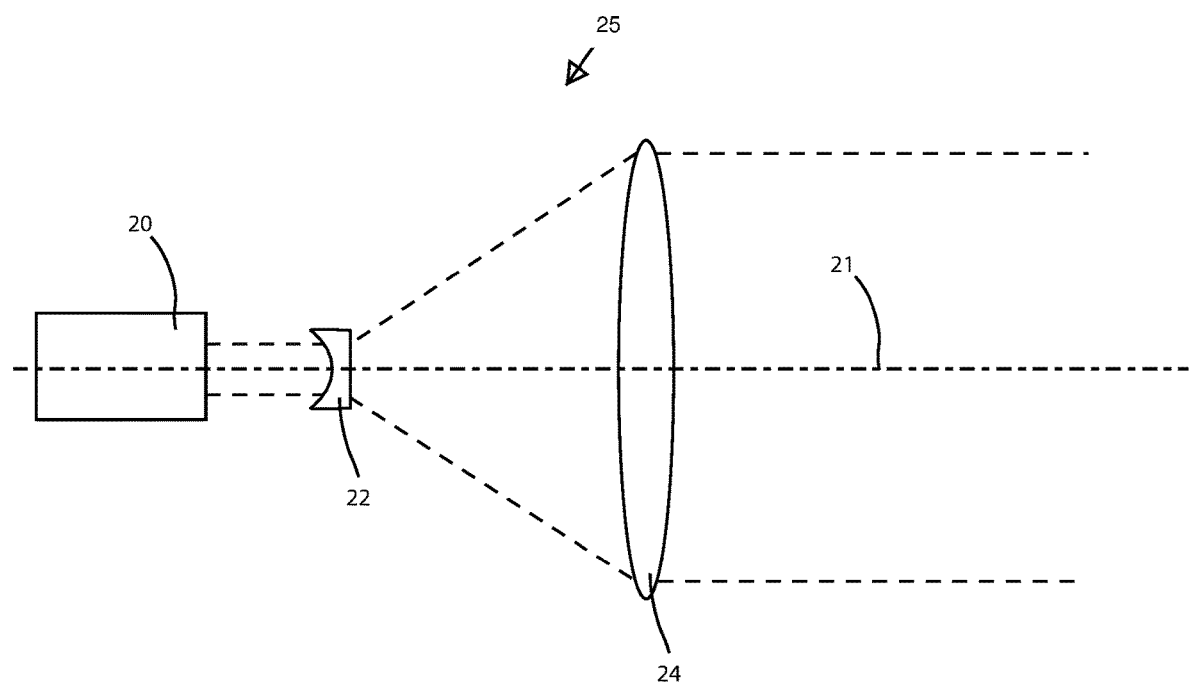
FIG. 2 illustrates an embodiment of an improved laser module optical design for an automated luminaire.

FIG. 2 illustrates an embodiment of the improved laser module optical design for an automated luminaire. Laser optical module 25 includes a laser module 20, which emits a narrow collimated beam along optical axis 21 towards lenses 22 and 24. Lenses 22 and 24 act as a beam expanding system such that the output beam from the optical system remains parallel and collimated, but is significantly increased in diameter. The large parallel exit beam has a lower power density than the narrow input beam and thus, is much safer for the audience. The system illustrated in FIG. 2 utilizes a negative lens 22, and a positive lens 24. However, other optical systems using any number of lenses are possible without detracting from the intent of the disclosure. In particular, it is known to produce an alternative beam expanding optical system using two positive lenses. It is also possible to use holographic lenses or reflective systems to achieve beam expansion.

Laser module 20 may contain a single laser of a single color, or may contain an array of lasers in multiple colors, for example, red, green, and blue/violet lasers.

Figure 3:
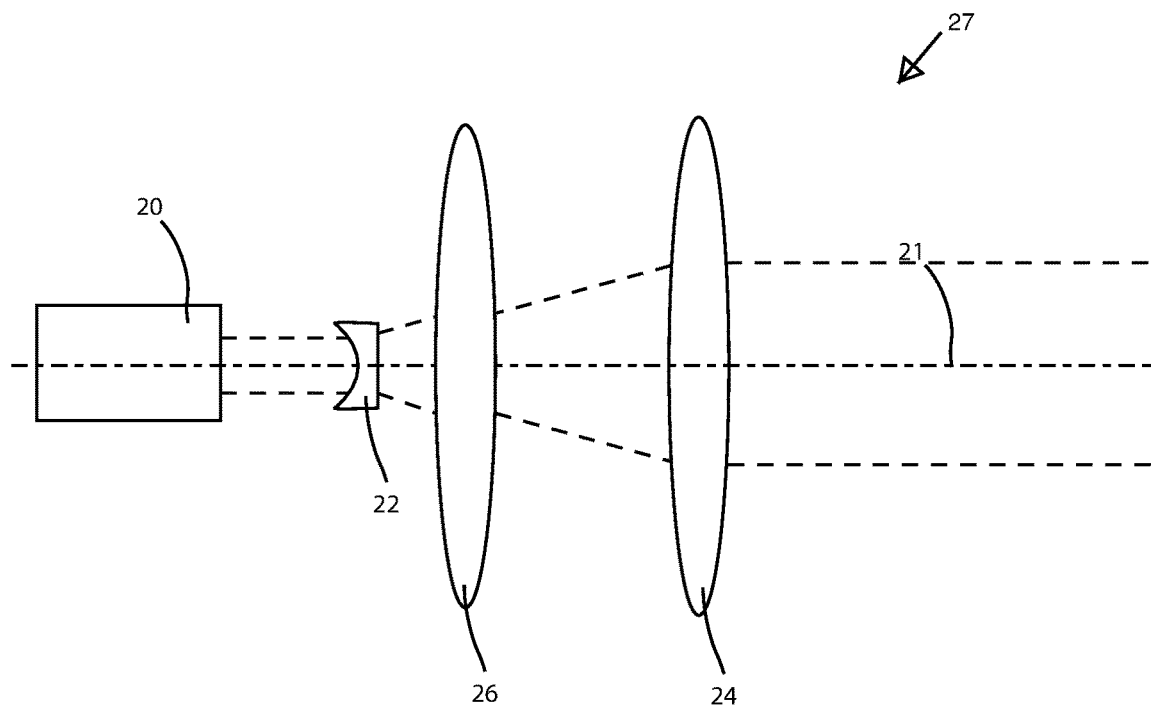
FIG. 3 illustrates a further embodiment of the improved laser module optical design for an automated luminaire.
Figure 4:
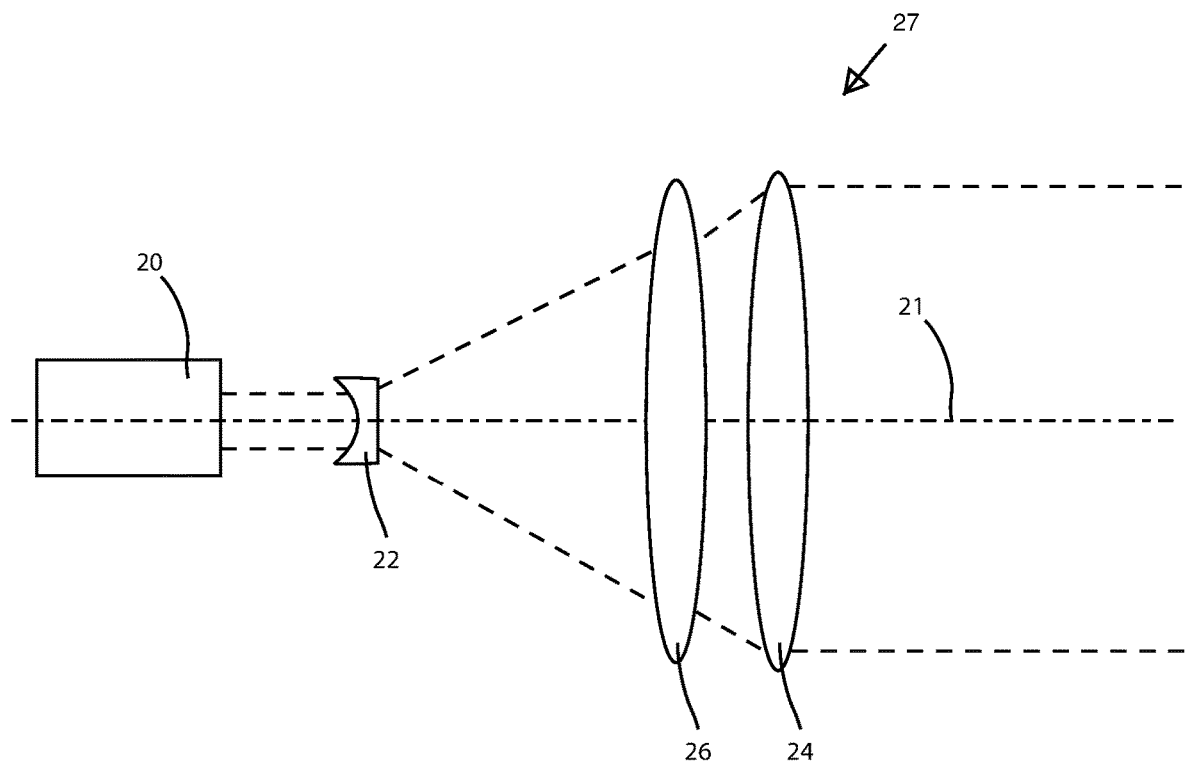
FIG. 4 illustrates a further embodiment of the improved laser module optical design for an automated luminaire.

FIGS. 3 and 4 illustrate a further embodiment of the improved laser module optical design for an automated luminaire. Laser optical module 27 includes laser module 20, which emits a narrow collimated beam along optical axis 21 towards lenses 22, 24, and 26. Lenses 22, 24, and 26 act as a beam expanding system such that the output beam from the optical system remains parallel and collimated, but is significantly increased in diameter. The large parallel exit beam has a lower power density than the narrow input beam and is thus much safer for the audience. In this embodiment one or more of lenses 22, 24, and 26 may be moved along the optical axis 21. This movement allows adjustment of the beam expansion of the optical system. In FIG. 3 lenses 22, 24, and 26 are adjusted such that the output beam is narrow (although still wider than the input beam) while in FIG. 4 lenses 22, 24, and 26 are adjusted such that the output beam is wide. The system illustrated in FIGS. 3 and 4 utilizes a negative lens 22, and two positive lenses 24 and 26. However, other optical systems using any number of lenses are possible without detracting from the intent of the disclosure. It is also possible to use holographic lenses or reflective systems or a gradient beam splitter to achieve beam expansion.

The movement of one or more lenses 22, 24, and 26 along the optical axis 21, and thus the amount of beam expansion, may be achieved using stepper motors, linear actuators, servo motors, or other mechanisms as well known in the art.

Laser module 20 may contain a single laser of a single color, or may contain an array of lasers in multiple colors, for example, red, green, and blue lasers.

Figure 5:
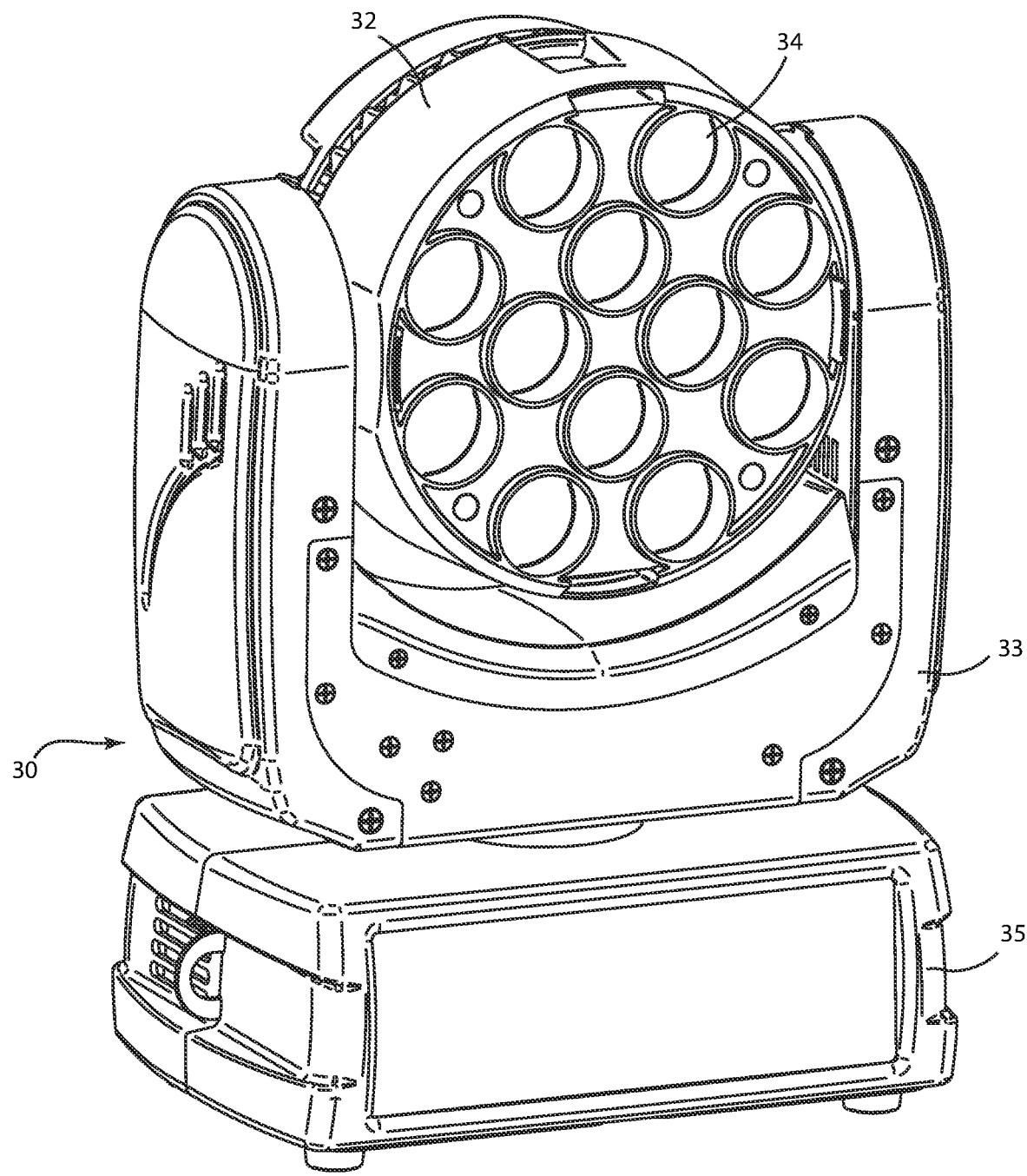
FIG. 5 illustrates an automated luminaire fitted with a plurality of laser modules.

FIG. 5 illustrates an automated luminaire fitted with a plurality of laser modules. Automated luminaire 30 comprises a base 35, rotatably connected to a yoke assembly 33, which in turn is rotatably connected to a head 32. The rotation of the yoke assembly 33 relative to the base 35 is often referred to as pan, and rotation of the head 32 relative to the yoke assembly 33 is often known as tilt. By combined and coordinated control of pan and tilt motions, the head 32 may be pointed in any desired direction relative to the fixed base 35.

The head 32 is fitted with a plurality of light emitting modules 34, arranged in two concentric rings. Each of the light emitting modules 34 comprises a laser module and optical system as illustrated in FIGS. 2, 3, and 4. In this embodiment each of the light emitting modules 34 may be controllable independently for color and beam expansion.

Figure 6:
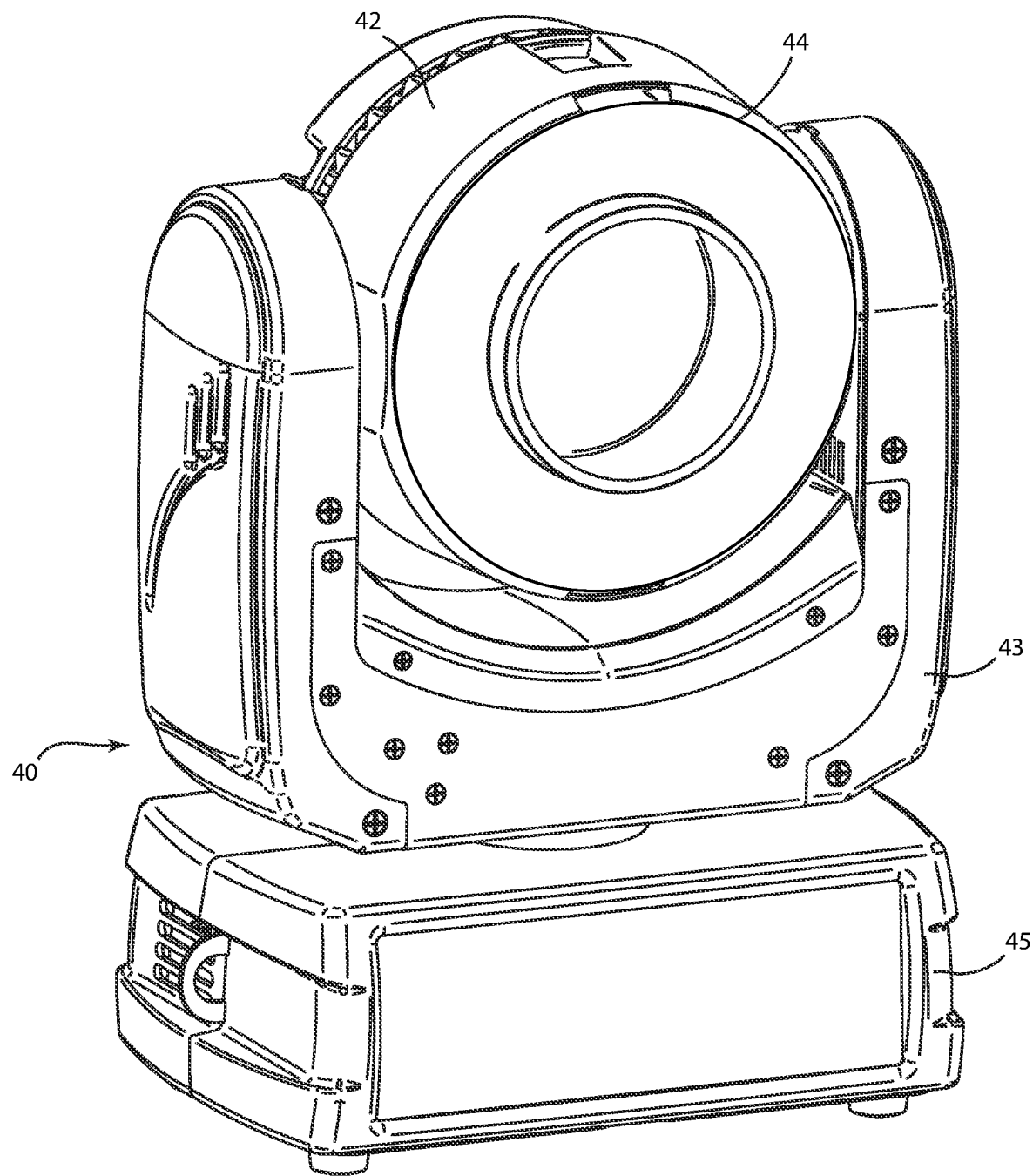
FIG. 6 illustrates an automated luminaire fitted with a single laser module.

FIG. 6 illustrates an automated luminaire fitted with a single laser module. Automated luminaire 40 comprises a base 45, rotatably connected to a yoke assembly 43, which in turn is rotatably connected to a head 42. The rotation of the yoke assembly 43 relative to the base 45 is often referred to as pan, and rotation of the head 42 relative to the yoke assembly 43 is often known as tilt. By combined and coordinated control of pan and tilt motions, the head 42 may be pointed in any desired direction relative to the fixed base 45.

The head 42 is fitted with a light emitting module 44, which comprises a laser module and optical system as illustrated in FIGS. 2, 3, and 4 of this document. In this embodiment, the light emitting module 44 may be larger and more powerful than those light emitting modules 34 illustrated in FIG. 5. Light emitting module 44 may be controllable for color and beam expansion.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An automated luminaire comprising:
 a base; and
 a head, rotatably connected to the base and configured for pan and tilt motion relative to the base, the head comprising a plurality of light emitting modules arranged in two concentric rings, each light emitting module comprising:
  a laser module configured to generate a laser light beam; and
  an optical module configured to widen an effective diameter of the laser light beam, the optical module comprising one or more moveable lenses that control the effective diameter of the laser light beam.

2. The automated luminaire of claim 1, wherein each laser module is configured to generate the laser light beam of more than one primary color or a variety of colors based on combinations of the primary colors.

3. The automated luminaire of claim 2, wherein the primary colors are: red and green, red and blue, green and blue, or red, green and blue.

4. The automated luminaire of claim 1, wherein each optical module comprises a negative lens followed by a positive lens.

5. The automated luminaire of claim 1, wherein at least one optical module comprises a holographic lens.

6. The automated luminaire of claim 1, wherein at least one optical module comprises a gradient beam splitter configured to split the laser light beam into a plurality of individual laser beams.

7. The automated luminaire of claim 1, wherein a pan and tilt yoke mechanism rotatably connects the head to the base.

8. The automated luminaire of claim 1, wherein each optical module comprises a negative lens followed by two positive lenses.

9. The automated luminaire of claim 8, wherein at least one of the two positive lenses of each optical module is configured for controllable motion along an optical axis of the optical module.

* * * * *